Oct. 24, 1961    R. G. BECKER    3,005,653
HELICOPTER CARGO PICKUP DEVICE
Filed June 8, 1959    3 Sheets-Sheet 1

INVENTOR.
Reynolds G. Becker
BY
ATTORNEYS

Oct. 24, 1961 R. G. BECKER 3,005,653
HELICOPTER CARGO PICKUP DEVICE
Filed June 8, 1959 3 Sheets-Sheet 2
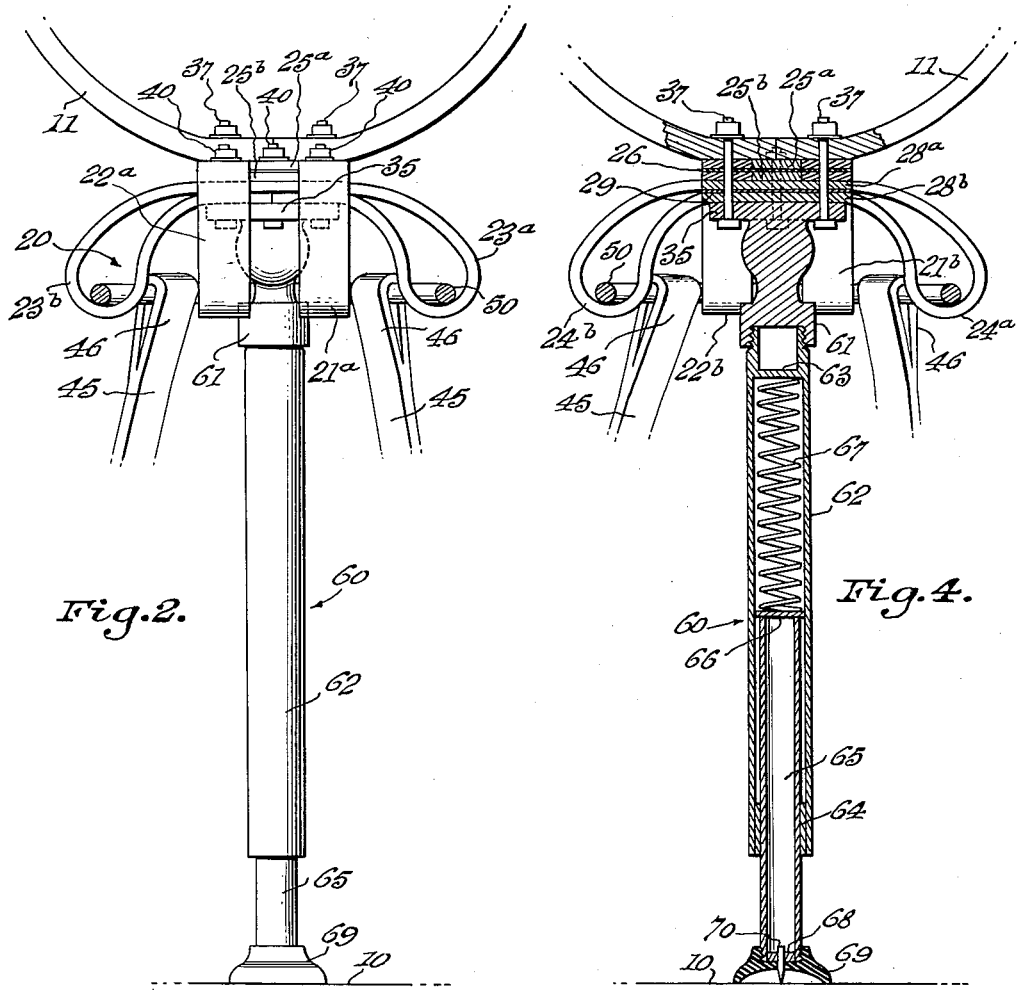
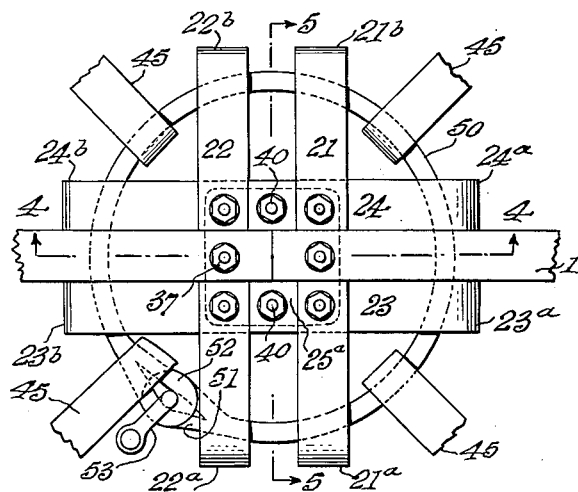
INVENTOR.
Reynolds G. Becker
BY
ATTORNEYS Oct. 24, 1961 R. G. BECKER 3,005,653
HELICOPTER CARGO PICKUP DEVICE
Filed June 8, 1959 3 Sheets-Sheet 3

INVENTOR.
Reynolds G. Becker
BY
ATTORNEYS

United States Patent Office 3,005,653
Patented Oct. 24, 1961

3,005,653
HELICOPTER CARGO PICKUP DEVICE
Reynolds G. Becker, Yorktown, Va., assignor to the United States of America as represented by the Secretary of the Army
Filed June 8, 1959, Ser. No. 818,981
4 Claims. (Cl. 294—74)
(Granted under Title 35, U.S. Code (1952), sec. 266)

The invention described herein may be manufactured and used by or for the Government for governmental purposes without the payment of any royalty thereon.

The present invention generally relates to material handling and in particular relates to the transportation of cargo by helicopter.

It has become common practice to transport palletized cargo by suspending the cargo in a sling and attaching the sling to a hook beneath a helicopter. It is usually necessary and almost always desirable to fly the helicopter to the spot where the cargo rests on the ground rather than to transport the cargo to the helicopter landing spot. Frequently it is impossible due to the size of the cargo, the local terrain, or other factors, for the helicopter to land astraddle or sufficiently close to the cargo to permit connection of the sling and cargo hook. For these and other reasons it is necessary and desirable to pick the cargo up while the helicopter is in hovering flight directly over the cargo. Since the cargo slings heretofore used are fabricated of flexible straps, a person must remain under the hovering helicopter and manually connect the sling to the cargo hook. Obviously, this procedure of picking up the cargo is quite hazardous to ground personnel and further results in a substantial waste of time and effort in the course of large scale operations.

Therefore, the object of the present invention is to provide a device for lifting cargo which can be quickly connected to and disconnected from a helicopter cargo hook without manual assistance from personnel on the ground and while the helicopter is in hovering flight over the cargo.

Additional objects and advantages of the present invention will occur to those skilled in the art from the following detailed description and drawings wherein:

FIG. 2 is a partial side elevation of the device of FIG. 1;

FIG. 3 is a partial top view of the device of FIG. 1;

FIG. 4 is a partial cross-sectional side view taken along lines 4—4 of FIG. 3;

Figure 1:
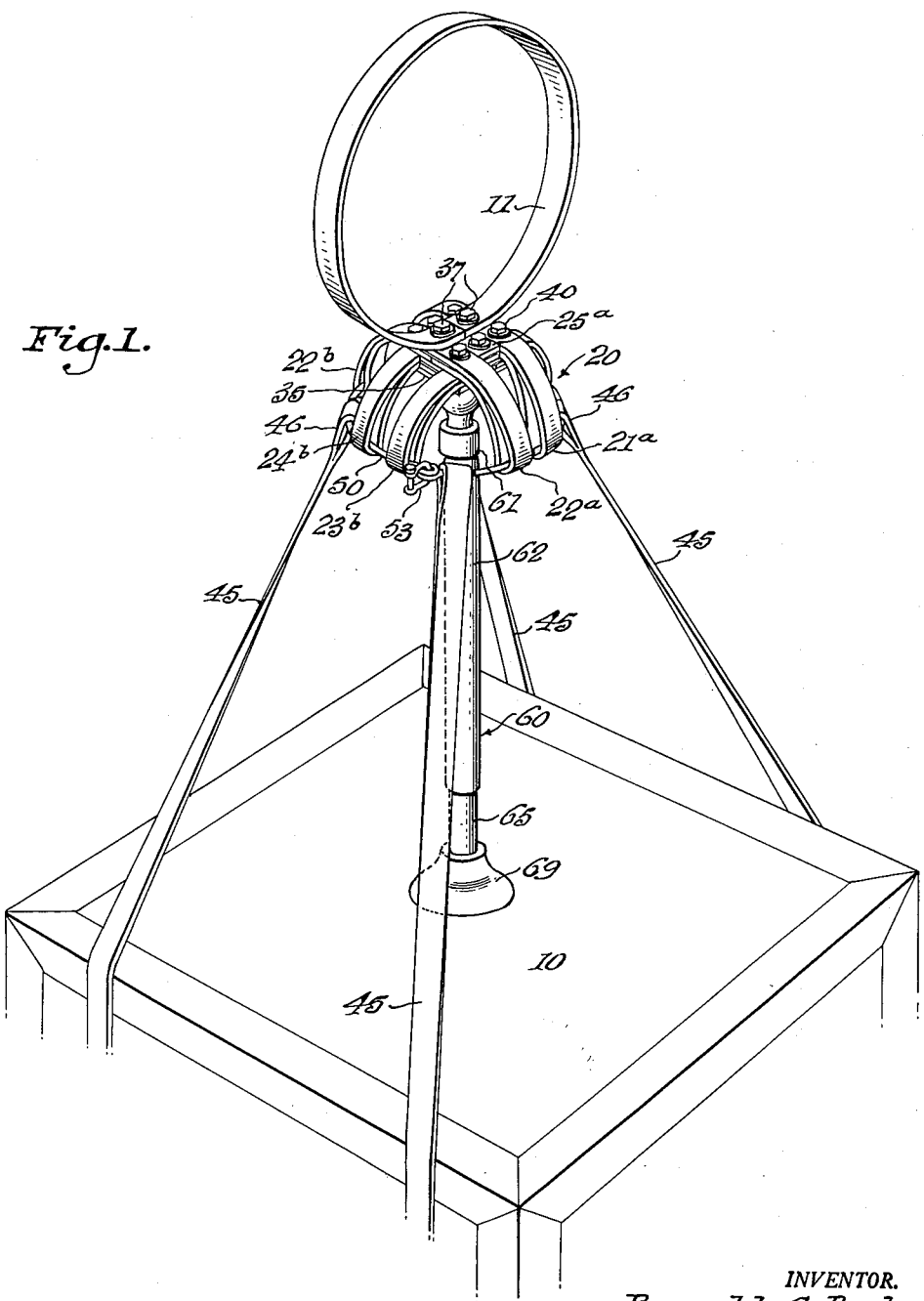
FIG. 1 is a perspective view of a device constructed in accordance with the present invention. The device is in operative position with relation to a cubical cargo container.
Figure 6:
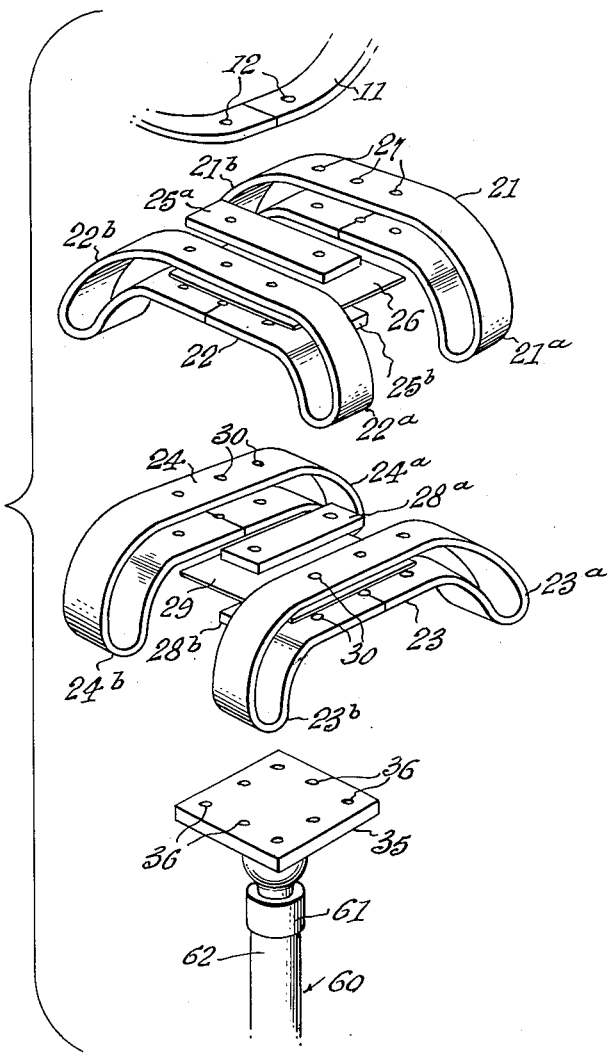
FIG. 6 is an exploded isometric view primarily of that portion of the device of FIG. 1 which is shown in FIG. 5.
Figure 5:
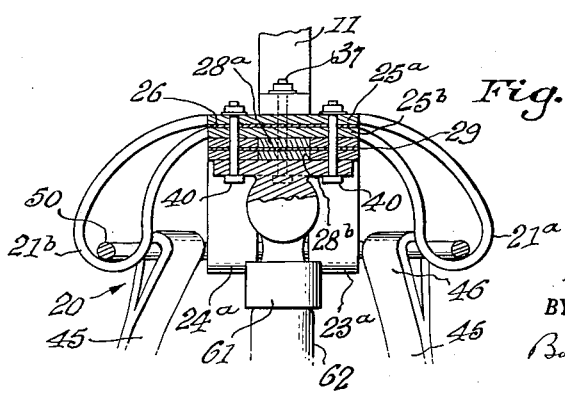
FIG. 5 is a partial cross-sectional side view taken on lines 5—5 of FIG. 3.

The embodiment of the present invention herein described in detail is basically comprised of a carrying loop 11 which is attached to a sling which includes a spider 20, ring 50, and sling straps 45. A longitudinally expansible tensioning rod 60 is positioned between the sling and the cargo 10 so that the rod holds the sling straps taut and conversely the sling straps act as guys to hold the rod in upright position. Rod 60 contacts the sling directly under the carrying loop 11 which is thereby held in upstanding position for ready engagement with a cargo lifting hook such as that of a helicopter.

The carrying loop 11 is preferably fabricated of nylon webbing or some similar material which has great strength, is light in weight, and which is sufficiently stiff to maintain the generally circular shape illustrated in the drawings when the loop is unloaded, i.e., when the loop is not subjected to the weight of the cargo. The manner in which the carrying loop is connected to the remainder of the device is hereafter described in detail.

The spider, generally indicated at 20, is comprised of four straps 21, 22, 23, and 24, each of which is doubled to form loops 21a, 21b, 22a, 22b, 23a, 23b, and 24a, 24b, respectively. Straps 21 and 22 are disposed in parallel relationship and separated by spacers 25a and 25b, both of which are of the same width and thickness as straps 21 and 22. The straps and spacers are preferably fabricated of nylon webbing or some similar high strength, light weight fabric. A square piece 26, fabricated of a tough resilient material such as leather, is inserted between both doubled straps 21, 22 and the spacers 25a, 25b. Both straps and spacers are thoroughly stitched to the square piece and to each other to form an integral square of uniform thickness throughout and having four loops 21a, 21b, 22a, and 22b. Bolt holes 27 are uniformly spaced around the periphery of the integral square. Straps 23 and 24, spacers 28a and 28b, and square piece 29 are arranged and stitched to form a second integral square having four loops 23a, 23b, 24a, 24b, and bolt holes 30. This second integral square is identical in size and structure with the one previously described except that the four loops are slightly shorter. The two square centers are then superimposed with straps 21, 22 above and perpendicular to straps 23, 24 so that the bolt holes in each square are aligned.

A square flange 35, which has eight bolt holes 36, is positioned below straps 23 and 24 and the bolt holes 36 are aligned with holes 27 and holes 30. Loop 11, which has two bolt holes 12, is positioned above and perpendicular to straps 21, 22. One hole 12 is aligned with center bolt hole of strap 21, and the other hole 12 is aligned with the center bolt hole of strap 22. Two long bolts 37 pass successively through flange holes 36, holes 30, holes 27, and finally through holes 12 of loop 11. Bolts 37 are provided with washers and nuts which are screwed down tightly to secure the loop 11 to the flange 35. Six bolts 40 successively pass through flange holes 36, holes 30, and holes 27 and are capped by washers and nuts to clamp the straps 21 through 24, etc., into a strong, unitary spider having eight loops 21a, 21b, 22a, 22b, 23a, 23b, 24a, and 24b radially disposed as shown in FIG. 3.

The sling straps 45 are fabricated of nylon webbing or some similar material. Four straps are conveniently used as illustrated in the present embodiment. The straps can be two continuous pieces which pass around the cargo container 10. Or, each of the four straps can be secured directly to the cargo container or a cargo pallet or attached in any other suitable manner where oddly shaped objects are to be lifted. Each strap is shown as having integral loops at the upper end. Of course, any appropriate method of connecting the straps to the wire rope ring 50 can be used. A single length of wire rope, or a material having similar characteristics and attributes, is provided with thimbles 51 and 52 at opposite ends thereof. The wire rope is threaded through the spider loops and the sling strap loops 46 as shown in FIG. 2. A screw pin shackle 53 is threaded through the thimbles and secured to form a complete ring 50. From the preceding description it should be noted that the weight of the cargo is transmitted through the sling straps 45 to the wire rope ring 50, to the spider 20, to flange 35, to bolts 37, and finally to carrying loop 11.

Integral with the flange 35 is an internally screw-threaded collar 61. An outer tubular member 62 has one end threaded which is received in collar 61. Outer tubular member 62 has a plug 63 which seals the end of the tube received in collar 61. A sleeve bushing 64 is secured in the opposite or lower end of outer tube 62. An inner tubular member 65 is slidingly received in sleeve bushing 64. Attached to the upper end of inner tube 65 is a cap 66 which is larger than the inside diameter of sleeve 64 and only slightly smaller than the inside diameter of outer tube 62. Thus cap 66 prevents the inner tube disengaging the sleeve bushing 64 and also prevents radial play of the upper end of the inner tube within the outer tube. A coil spring 67 is contained inside the outer tube 62 and is disposed between plug 63 and cap 66. Spring 67 continually exerts a biasing force tending to extend the telescoping inner and outer tubes to maximum length. Of course it will be appreciated that other types of tensioning rods which automatically expand to exert a biasing force in the longitudinal direction can be employed without departing from the present invention. Attached to the bottom of inner tube 65 is a plug 68 and a suction cup 69. A small spike 70 is connected to the plug 68 and passes through the suction cup 69.

In operation, the sling straps 45 are connected to the cargo to be transported in any appropriate manner. If the wire rope ring 50 is not already connected, the ring is threaded through the loops of the spider and the strap loops and the shackle is secured. Then the tensioning rod 60 is compressed and placed in upright position on the cargo. When the rod is released, the spring 67 elongates the rod until the sling straps 45 are taut. Since the straps are taut they will remain in proper position around the cargo. The taut straps also act as guys to hold the tensioning rod 60 in upright position. The suction cup 69 aids in holding the bottom end of the tensioning rod in position so long as the cargo container is constructed of a smooth surfaced material such as metal. The small spike 70 likewise aids in holding the rod in position when the cargo surface is of wood or other soft material. Since the carrying loop 11 is attached to the tensioning rod 60 and is fabricated of a relatively stiff material so as to retain its shape, the loop is presented in upstanding position for ready engagement with the cargo hook of a helicopter. The helicopter pilot merely flies the cargo hook into engagement with the carrying loop. As the cargo is lifted, the weight of the cargo will stretch the straps and spider. However, the coil spring of the tensioning rod keeps the lower end of the rod in firm contact with the cargo. When the cargo is next touched to the ground the tensioning rod will still be in place and the carrying loop will attain its open posture as the load of the cargo is removed. The helicopter pilot then merely flies the hook out of engagement with the carrying loop and the helicopter continues on its way having picked up and delivered the cargo without landing and without assistance from personnel on the ground.

I claim:

1. A device for lifting cargo comprising a carrying loop, a sling connected to said loop, and a longitudinally expansible tensioning member connected on one end to said loop and said sling and extending substantially vertically downward to contact with said cargo, said sling having flexible straps radiating from said one end of said tensioning member for engaging and lifting a cargo, whereby upon engagement of the sling straps and the other end of said tensioning member with a cargo, said sling straps are held taut by said tensioning member, said tensioning member is held in upright position by said sling straps, and said carrying loop is presented in upstanding position for ready engagement with a hook.

2. A device for lifting cargo by helicopter comprising a carrying loop of sufficient rigidity to maintain an open shape, a telescoping tensioning rod spring-biased toward the extended position and positioned substantially vertically with its lower end in contact with said cargo, a flange attached to the upper end of said tensioning rod, a spider having a plurality of loops disposed between said flange and said carrying loop, clamping means interconnecting said flange, said spider, and said carrying loop, a sling having straps for engaging and lifting a cargo, and means connecting the straps of said sling to the loops of said spider.

3. In combination with a cargo, a device for lifting said cargo which can readily be engaged by a hovering helicopter, said device comprising a sling having flexible straps connected to lift said cargo, a carrying loop of sufficient rigidity to maintain an open shape connected to said sling, and an expansible tensioning means positioned between said sling and said cargo and held in an upright position by said sling whereby said sling straps are held taut by said tensioning means and said carrying loop is presented in upright position for ready engagement with a hook carried by a helicopter.

4. In combination with a cargo, a device for lifting said cargo which can readily be engaged by a hovering helicopter, said device comprising a sling and a longitudinally expansible tensioning member, said sling having a carrying loop of sufficient rigidity to maintain an open shape connected to one end of said longitudinally expansible tensioning member the other end of which longitudinally expansible tensioning member engages the cargo, said sling having flexible straps connected to the cargo which straps are held taut by the expansible tensioning member and which straps hold the tensioning member in an upright position thereby presenting the carrying loop in upstanding position for ready engagement with a hook carried by a hovering helicopter.

References Cited in the file of this patent

UNITED STATES PATENTS

| 1,974,891 | Poliakoff | Sept. 25, 1934 |
| 2,488,538 | Hoehn et al. | Nov. 22, 1949 |
| 2,692,120 | Cotton et al. | Oct. 15, 1954 |

FOREIGN PATENTS

| 166,552 | Austria | Aug. 25, 1950 |